June 19, 1956  R. J. MILLER ET AL  2,750,863
IMPLEMENT HITCH FOR TRACTORS
Filed Oct. 8, 1951  4 Sheets-Sheet 1
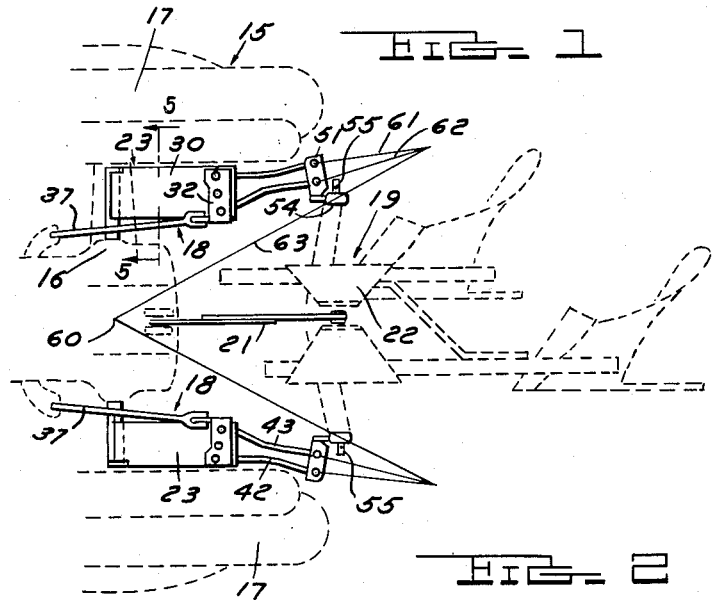
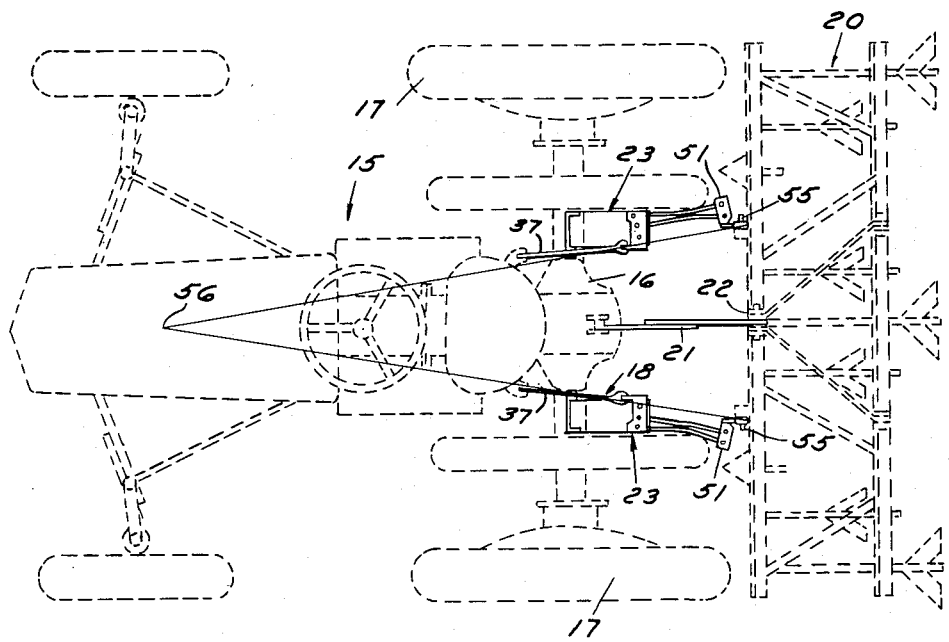
INVENTORS
RAYMOND J. MILLER
RALPH C. FREVIK
BY RAYMOND W WILSON
ATTORNEY

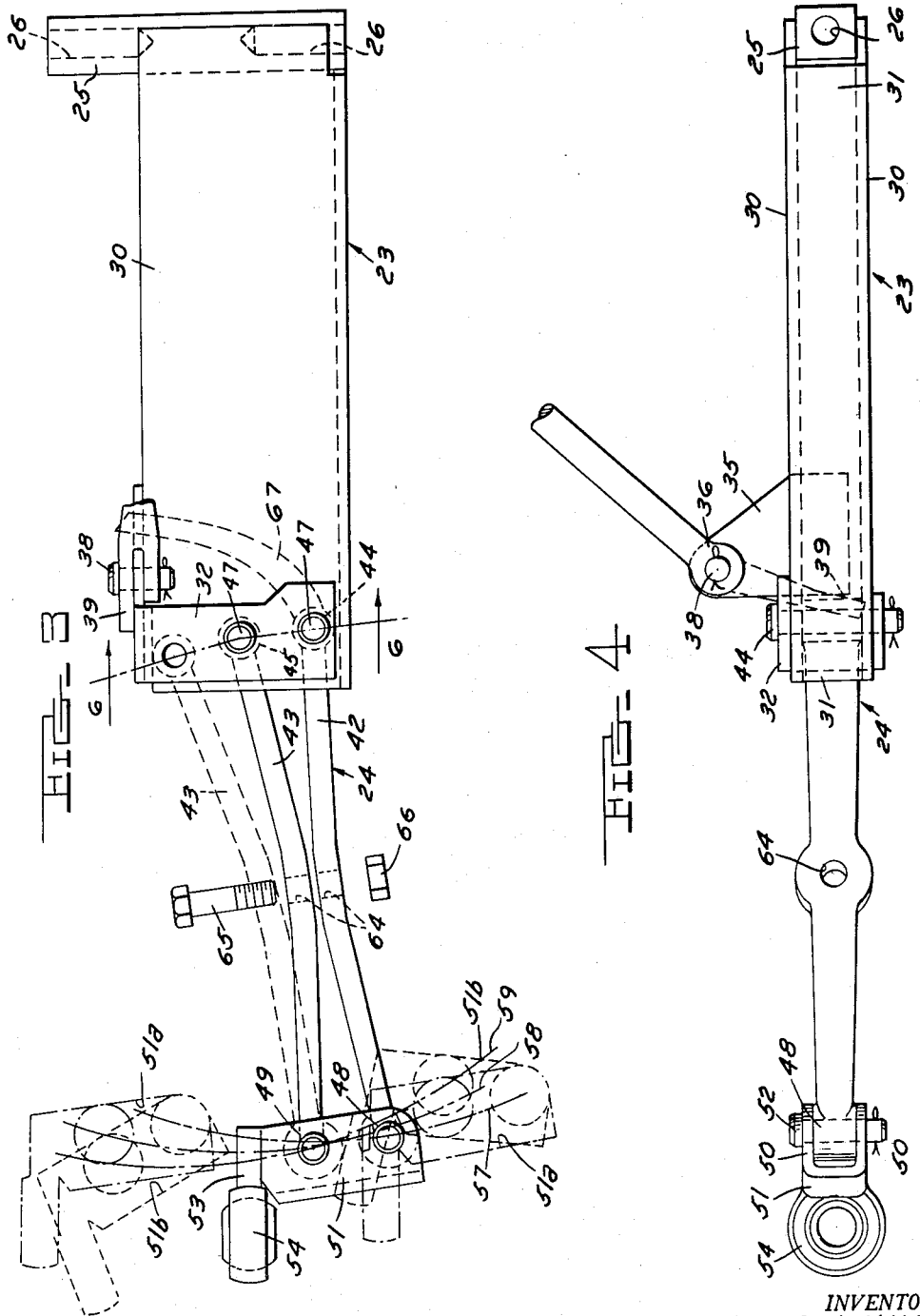

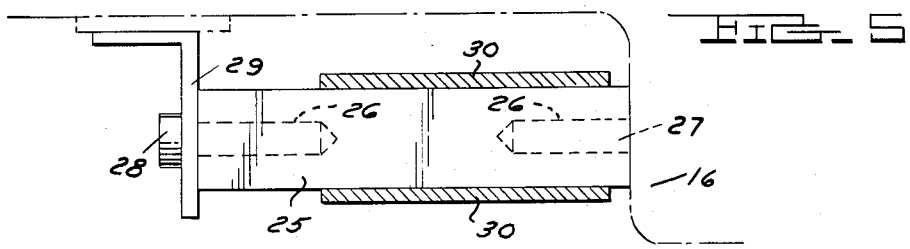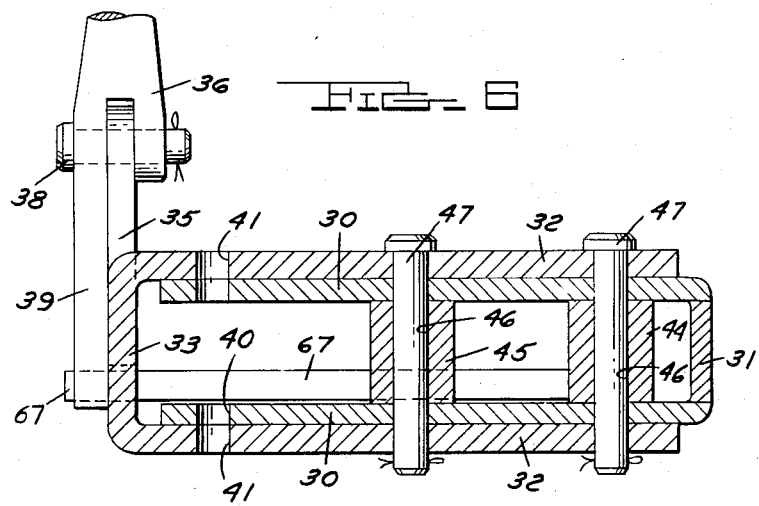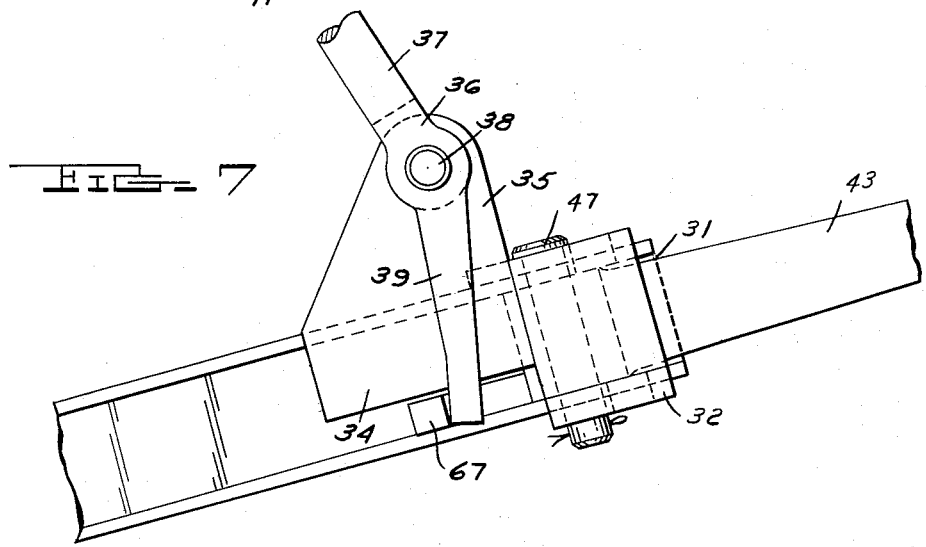

June 19, 1956  R. J. MILLER ET AL  2,750,863
IMPLEMENT HITCH FOR TRACTORS
Filed Oct. 8, 1951  4 Sheets-Sheet 4
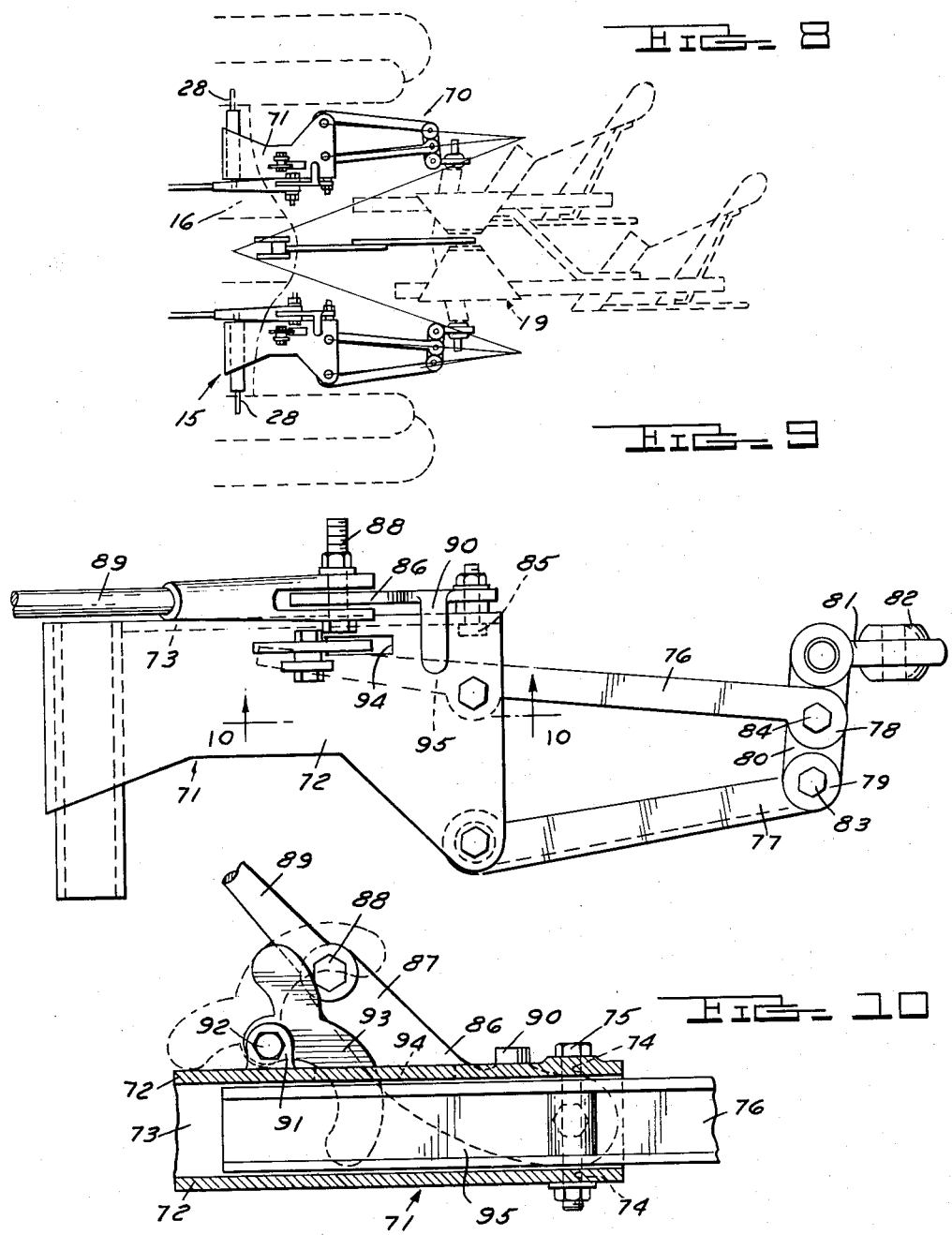
INVENTORS
RAYMOND J. MILLER
RALPH C. FREVIK
BY RAYMOND W. WILSON
ATTORNEY

United States Patent Office 2,750,863
Patented June 19, 1956

2,750,863
IMPLEMENT HITCH FOR TRACTORS

Raymond J. Miller and Ralph C. Frevik, Detroit, and Raymond W. Wilson, Ferndale, Mich., assignors, by mesne assignments, to Ford Motor Company, Dearborn, Mich., a corporation of Delaware Application October 8, 1951, Serial No. 250,252

7 Claims. (Cl. 97—47.65)

The present invention relates to an implement hitch for tractors and more particularly to a hitch of the variable forward convergence type having a pair of laterally spaced draft links each of which is composed of longitudinally aligned, relatively laterally shiftable hitch elements, including individually swingable elements movable in different arcuate paths to steer an implement carried thereby about a selected forwardly located effective steering point.

The present invention provides an implement hitch whereby the desired effective implement steering point is correlated with the operational characteristics of the implement being utilized. Thus, for use with moldboard or disc plows, or similar implements generating substantial unbalanced side draft forces in use, the effective steering point is desirably located in the vicinity of the tractor rear axle, so that any side draft forces are absorbed by the tractor rear wheels to prevent interference with tractor steering. With an implement generating substantially no unbalanced side draft forces, such as a cultivator or the like, the effective steering point of the implement is preferably located in the vicinity of the tractor front axle so that steering of the implement coincides with that of the tractor.

Structurally, the present invention comprises a pair of laterally spaced draft links each composed of a forward link element secured to the tractor for vertical movement about a horizontal pivot axis upon actuation of the power-lift system of the tractor, and rearward hitch elements pivoted to the forward elements for lateral pivoting movement about a substantially vertical pivot axis. The rear hitch elements comprise a pair of laterally adjacent rearwardly extending arms having their rear ends pivotally connected to a steering crank arm which carries means for attachment to an implement. The laterally adjacent hitch arms are relatively laterally shiftable from a first position at which the arms are substantially parallel to a second position at which the arms are forwardly divergent. As will be later explained in detail, the steering crank arm is moved in an arcuate path upon lateral movement of the implement and/or the tractor relative to one another. Since the hitch arms are independently pivoted for movement in separate arcuate paths, steering of the crank arm occurs about a steering point located by vectorial resolution of the forces acting on the hitch arm. The arms are so designed and their operation is so correlated that lateral shifting of one of the arms changes the effective steering point of the implement relative to the tractor as hereinbefore explained.

The present invention is also provided with means for automatically centering the linkage upon actuation of the tractor power-lift mechanism to elevate the implement to a transport position, so that the implement is moved to and retained in a centered position during transport without the utilization of conventional centering means, such as the usual check chains or the like. The centering mechanism also serves to limit lateral swinging movement of the implement to prevent interference of the implement with the tractor rear tires. In addition, means are provided for rigidifying the linkage to prevent any lateral swinging movement whatsoever without the necessity of utilizing stabilizer links or the like as is now necessary.

It is, therefore, an important object of the present invention to provide an improved implement hitch for tractors including longitudinally aligned hitch elements relatively movable about separate lateral and vertical pivot axes and also including laterally shiftable hitch arms for steering an implement about a selected effective steering point.

Another important object is the provision of a tractor hitch wherein lateral steering of an implement about a selected steering point is effected by individual arcuate movement of a plurality of hitch arms about spaced pivot axes.

It is a further object of the present invention to provide an implement hitch including relatively laterally movable hitch elements together with means for automatically centering the elements and preventing lateral movement thereof upon power elevation of the implement.

Still another important object is the provision of an implement hitch wherein the normally relatively laterally movable hitch elements are stabilized against lateral movement by means engaging one of the laterally movable elements.

Yet another object is the provision of an implement hitch wherein lateral movement of an implement about a selected effective steering point is effected by differential pivotal movement of a pair of separately pivoted hitch arms movable relative to one another in a lateral plane.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Figure 1 is a fragmentary plan view of an implement hitch of the present invention utilized to connect a plow to a tractor;

Figure 2 is a plan view similar to Figure 1 illustrating the hitch utilized to connect a cultivator to a tractor;

Figure 3 is a plan view of the hitch alone;

Figure 4 is a side elevational view of the hitch of Figure 3;

Figure 5 is a fragmentary sectional view taken along the plane 5—5 of Figure 1;

Figure 6 is a sectional view, with parts shown in elevation, taken along the plane 6—6 of Figure 3;

Figure 7 is a view similar to Figure 4 illustrating the hitch when the implement is power-lifted and showing the operation of the self-centering means;

Figure 8 is a plan view similar to Figure 1 illustrating a modified form of the hitch of the present invention;

Figure 9 is a plan view of the modified hitch; and

Figure 10 is a fragmentary sectional view taken along the plane 10—10 of Figure 9.

As shown on the drawings:

In Figures 1 and 2, reference numeral 15 refers to a tractor having a rear axle housing 16 interposed between the rear tractor wheels 17. The tractor is provided with trailing hitch links 18 of the present invention to be hereinafter more fully described in detail and serving to attach an implement, such as a plow 19 (Figure 1) or a cultivator 20 (Figure 2), to the tractor. In addition to the tractor-implement hitch links 18, the rear axle housing 16 carries the conventional upper link 21 secured to the A-frame 22 of the associated implement 19—20.

Hitches somewhat similar to those herein disclosed and claimed are disclosed in the pending application of Raymond W. Wilson, Serial No. 195,158, filed November 13, 1950, and assigned to the assignee of the present invention. These earlier disclosed hitches do not have the features of variable convergence and separately pivoted forward and rear hitch link elements, nor does the earlier application disclose the lateral movement limiting means of the present invention.

As best illustrated in Figures 3 and 4, the hitch links 18 of the present invention comprise a forward section 23 and a rear section 24. The forward link section 23 of each hitch link includes a laterally extending attachment member 25 having opposed inwardly extending bolt recesses 26 adapted to receive therein a first mounting bolt 27 projecting laterally from the underside of the tractor rear axle housing 16 and an opposing pivot bolt 28 projecting through a depending bracket 29 carried on the undersurface of the rear axle housing in laterally spaced relation to the center portion thereof (Figure 5). The forward link portion 23 also includes vertically spaced parallel plates 30 joined along one longitudinal edge by a web 31 preferably welded to the plates 30. At the extreme rear end of the plates 30, a generally U-shaped bracket is provided, the bracket having elongated laterally extending legs 32 enclosing the rear portions of the plates 30 and joined by a vertical web 33 provided with a forwardly extending projection 34 having an integrally formed upstanding terminal portion 35. The portion 35 is adapted to be inserted between the leg of a clevis 36 formed at the lower extremity of lift link 37 secured at its upper end to tractor mounted rock arms which are adapted to be power-lifted by the conventional tractor hydraulic system. The arms of the clevis 36 and the projection 35 are provided with laterally registering apertures through which a pivot bolt 38 is insertable. The outer arm of the clevis 36 is provided with a depending extension 39 to be hereinafter more fully described.

In addition to providing the lift arm connection member 35, the bracket legs 32 also rigidify the forward hitch element 23 at its rearmost portion, the element plates 30 and the bracket legs 32 being provided with registering vertical apertures 40 and 41 respectively. As best seen in Figures 3 and 6, three laterally spaced sets of vertically aligned apertures 40 and 41 are provided.

The rear link portion 24 comprises a pair of laterally spaced link arms 42 and 43, each of the arms being provided with an enlarged embossment 44 and 45 respectively, at the forward ends thereof, these embossments being insertable between the plates 30 and having vertical apertures 46 therethrough registerable with the apertures 40 and 41. Vertically extending pivot pins 47 are adapted to be inserted through the registering apertures 40, 41 and 46 so that the hitch arms 42 and 43 are disposed for free relative pivoting movement about vertically extending pivot axes defined by said pins 47.

The rear ends of the arms 42 and 43 are provided with embossments 48 and 49 receivable between the vertically spaced arms 50 of a laterally extending clevis bracket 51, and the embossments are provided with axial apertures registerable with corresponding apertures formed in the bracket arms 50 to receive pivot pins 52 therethrough. The inner end of the clevis bracket 51 carries a rearwardly extending arm 53 terminating in a segmental spherical, centrally apertured bearing 54 adapted for attachment to laterally projecting attachment pins 55 (Figures 1 and 2) carried by the implement 19—20. The spacing between the apertures of the clevis brackets 50 is equal to the spacing between the laterally aligned series of apertures 40 and 41 provided by the front link element 23, so that the arms 42 and 43, insofar as the connection between the clevis bracket 51 and the forward element 23 is concerned, are parallel when the pins 47 and 52 are inserted in adjacent apertures. On the other hand, when the pins 47 are inserted in the outer apertures 40 and 41, the adjacent link element 42 and 43 are forwardly divergent, as illustrated in Figure 1 and in dotted outline in Figure 3.

In Figure 3 the differential swinging movement of the arms 42 and 43 is illustrated in dotted outline. When the forward ends of the arms 42 and 43 are positioned by pins 47 and 54 inserted in adjacent apertures, swinging movement of the arms upon relative tractor-implement movement results in corresponding swinging movement of the clevis bracket 51 to the positions 51a, illustrated in the dot-dash lines of Figure 3. This swinging movement takes place as if the clevis bracket 51 were supported by a single arm pivoted for lateral movement at the point 56 (Figure 2) located on the central longitudinal draft line of the tractor in the vicinity of the tractor front axle. Such movement may be graphically illustrated by the location of arcs 57 and 58 upon which the pins 52 connected to the arms 42 and 43 swing with the differential swinging movement of the arms accomplishing the desired steering action.

On the other hand, when the pins 47 are inserted in the extreme apertures, so that the arm 43 is moved to its dotted position of Figure 3, the pin 52 securing the arm 43 to the clevis bracket 51 swings in the arc 59 and the clevis bracket occupies positions 51b upon relative lateral tractor-implement swinging movement. By virtue of such swinging movement, the clevis bracket is steered as though it were attached to a single arm laterally pivoted about a point 60 located at the center of the rear axle housing. This center 60 may also be located by vector resolution of the forces acting upon the links, which resolution is accomplished as illustrated in Figure 1 by extending the arms 42 and 43, as along lines 61 and 62, and then drawing a third line 63 from the points of intersection of the lines 61 and 62 through the center of the segmental bearing 54.

Thus, it will be seen that the effective steering point of the implement 19—20 may be varied along the longitudinal draft line of the tractor by merely shifting the attachment points about which the elements 42 and 43 are relatively movable. Because of the differential pivotal movement of the pair of separately pivoted hitch arms 42 and 43, the implement is steered as though it were attached to the tractor at a point remote from the points of hitch arm attachment.

It will be noted from Figure 3 that the arms 42 and 43 are centrally apertured as at 64 to receive therethrough a locking bolt 65 adapted to receive a nut 66 thereon. When the bolt 65 is inserted through the aperture 64 and tightened therein, the arms are held against relative pivoting movement and lateral shifting of the implement relative to the tractor is prevented.

It will also be noted from Figures 3, 6 and 7 that the arm 42 is provided with an integrally formed forwardly and laterally offset projection 67 which extends forwardly of the arm embossment 44 to project lateraly beyond the forward hitch element 23 in closely spaced relation to the depending arm 39 of the lift arm 37. It will be seen that upon extreme pivoting movement of the arm 42 in one direction, namely counterclockwise as illustrated in Figure 3, the extension 67 will contact the depending arm 39 to prevent further lateral movement. Also, as illustrated in Figure 7, power elevation of the hitch link elements will cause the arm 39 to be moved in a clockwise direction (as viewed in Figure 7), so that the arm 39 will abut the projection 67. In this manner, the link arm 42 will be moved through the extension 67, and since a similar projection 67 and arm 39 are provided on the other hitch link, the entire linkage will be centered when in a transport position.

In the modified form of the present invention, illustrated in Figures 8–10, inclusive, reference numerals identical with those of Figures 1–7, inclusive, apply to identical portions of the apparatus.

In Figure 8, reference numeral 70 refers to a linkage for connecting a plow 19 to a tractor 15, the linkage including a forward element 71 connected to the tractor rear axle housing 16 as hereinbefore described and including vertically spaced plates 72 joined by a vertical web 73. The rear portions of the plates 72 are provided with spaced vertically aligned apertures 74 adapted to receive therethrough pivot bolts 75. The pivot bolts 75 serve to secure rear element arms 76 and 77 to the forward element 71 for lateral pivoting relative movement thereto. The rear extremities of the arms 76 and 77 are provided with clevis bosses 78 and 79 respectively adapted to receive therebetween a steering crank arm 80 carrying a rear extension 81 providing a semi-spherical attachment bearing 82.

It will be seen that the laterally extending crank arm 80 provides a laterally aligned series of three apertures with the arm 77 being secured to the crank arm by bolt 83 extending through the outermost of the crank arm apertures, and the arm 76 carrying a pivot bolt 84 which is adapted to be selectively inserted in either of the two inner crank arm apertures so that the relative angularity of the arms 76 and 77 may be varied from the forward divergence illustrated in Figure 8 to a substantially parallel position as hereinbefore explained in connection with the arms 42 and 43 of the first embodiment of the present invention.

The forward link element 71 carries a laterally extending pivot bolt 85 adjacent the rear edge thereof and serving to pivotally retain a lift extension 86 therein, the extension terminating in an upstanding portion 87 apertured to receive a bolt 88 joining a lift arm 89 thereto. The arm extension 86 is also provided with a laterally extending stop member 90 overlying an adjacent portion of the forward element 71 preventing excessive counter-clockwise movement of the extension 86 as illustrated in Figure 10. The lift arm 89 is effective to elevate the hitch element 70 as a whole about the pivot pins 28 on the tractor.

The forward link element 71 is also provided with a pair of upstanding ears 91 receiving a pivot bolt 92 therethrough pivotally supporting a locking dog 93. The upper forward element plate 72 is slotted, as at 94, to receive a dependent arm of the dog 93 therethrough, while the pivot bolt 92 accommodates pivoting movement of the dog 93 to a second position, illustrated in dotted outline in Figure 10, in which the dog is removed from the slot 94. The rear link element 76 is provided with a forward extension 95 which lies between the spaced plates 72 and which is adapted to abut that portion of the dog 93 extending into the slot 94 upon relative lateral movement of the front and rear linkage portions. Thus, the dog 93 serves as a means for limiting lateral movement of the linkage, and such limiting of movement may be obtained at any time by merely placing the dog in the position illustrated in solid outline in Figure 10.

From the foregoing description, it will be appreciated that the present invention provides an improved implement-hitch for tractors wherein lateral movement of an implement about a selected effective steering point is the result of differential pivotal movement of separately pivoted hitch arms relatively movable in a horizontal plane. Further, the effective steering point may be varied by shifting the pivot axes of the pair of hitch arms. This differential pivoted movement of the hitch arms results in the lateral steering of a crank arm attached to the link elements and to the implement. Also, novel means are provided for elevating the hitch elements, for limiting the lateral movement of the hitch elements, and for centering the elements upon elevation thereof to a transport position.

It will, of course, be understood that various details of construction may be varied through a wide range without departing from the principles of this invention and it is, therefore, not the purpose to limit the patent granted hereon otherwise than necessitated by the scope of the appended claims.

We claim:
1. In an implement hitch for a tractor, a vertically movable forward link element, a laterally movable rear link element pivoted to said forward element and having a forwardly projecting extension movable therewith in a lateral path, and a vertically extending holding dog pivotally mounted on said forward element for swinging movement to a position interposed in the path of lateral movement of said extension to limit the extent of lateral movement of said rear element.

2. An implement hitch for a tractor having a pair of laterally spaced power liftable rock arms, comprising a pair of laterally spaced forward hitch link elements attachable to the tractor for movement about a horizontal axis, means connecting each of said forward elements, respectively, to one of said rock arms for vertical movement upon power lifting of said rock arms, pairs of trailing rear link elements, each pair of rear link elements having the forward ends thereof pivoted to one of said forward elements, respectively, for relative movement about a first set of laterally spaced vertical axes, a pair of laterally extending crank arms, each of which is pivotally connected to the free trailing ends of one of said pairs of trailing rear elements for relative movement about a second set of laterally spaced vertical axes pivotally movable about separate laterally spaced axes, and means for shifting the relative lateral location of the vertical axes of one of said sets of spaced vertical axes.

3. For use with a tractor having a power liftable rock arm, the improvement of an implement hitch comprising a forward hitch link element attachable to the tractor for movement about a horizontal axis, means connecting said forward element to said rock arm for vertical movement upon power lifting of said rock arm, a pair of rear elements having their front ends pivoted to said front element for independent pivotal movement about vertical pivot axes, and a crank arm joining the free rear ends of said rear elements and adapted for attachment to an implement.

4. For use with a tractor having a power liftable rock arm, the improvement of an implement hitch comprising a forward hitch link element attachable to the tractor for movement about a horizontal axis, means connecting said forward element to said rock arm for vertical movement upon power lifting of said rock arm, a pair of rear elements having their front ends pivoted to said front element for independent pivotal movement about vertical pivot axes, and a laterally extending crank arm joining the free rear ends of said rear elements and adapted for attachment to an implement, said crank arm being selectively attachable to said free rear ends of said rear elements to vary the angular relationship of said rear elements to one another.

5. For use with a tractor having a power liftable rock arm, the improvement of an implement hitch comprising a forward hitch link element attachable to the tractor for movement about a horizontal axis, means connecting said forward element to said rock arm for vertical movement upon power lifting of said rock arm, a pair of spaced rear link elements pivoted to said forward element about separate laterally spaced, vertical axes and projecting rearwardly therefrom, and a lateral crank arm joining said rear link elements at the free ends thereof, said crank arm having an attachment bearing adapted to be attached to an implement, one of said rear elements having its free end laterally shiftable on said crank arm relative to the corresponding end of the other of said rear elements to vary the angular relationship of said rear elements and thereby vary the path of movement of said attachment bearing.

6. The combination of claim 5 including means pivotally connected to said forward elements and engageable with said rear elements to limit lateral movement of said rear elements.

7. In an implement hitch for a tractor, a pair of spaced draft hitch links, each of said hitch links including a tractor-attached link element having a free end and a forward end pivotally attached to the tractor for movement about a horizontal axis, a second link element having an end thereof pivotally attached to the free end of the tractor-attached link element for movement about a vertical axis, means connecting the opposite end of the second link element with an implement, and a member pivoted to one of said link elements and swingable to a position restricting the pivotal movement of the second link element relative to the tractor-attached link element.

References Cited in the file of this patent

UNITED STATES PATENTS

| | | |
|---|---|---|
| Re. 21,989 | Morkoski | Dec. 30, 1941 |
| 126,276 | Fawcett | Apr. 30, 1872 |
| 404,922 | Moore | June 11, 1889 |
| 745,478 | Brock | Dec. 1, 1903 |
| 1,137,052 | Cranford | Apr. 27, 1915 |
| 1,262,949 | Heylman | Apr. 16, 1918 |
| 1,637,811 | Ferguson | Aug. 2, 1927 |
| 1,838,865 | Paul | Dec. 29, 1931 |
| 1,916,945 | Ferguson | July 4, 1933 |
| 2,185,634 | Jacobs et al. | Jan. 2, 1940 |
| 2,364,887 | Wray | Dec. 12, 1944 |
| 2,521,503 | Clark | Sept. 5, 1950 |